(12) United States Patent
Sahin

(10) Patent No.: US 12,466,577 B2
(45) Date of Patent: Nov. 11, 2025

(54) ALIGNMENT SYSTEM

(71) Applicant: TUSAS—TURK HAVACILIK VE UZAY SANAYII ANONIM SIRKETI, Kahramankazan/Ankara (TR)

(72) Inventor: Durmus Ali Sahin, Kahramankazan/Ankara (TR)

(73) Assignee: TUSAS—TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 94 days.

(21) Appl. No.: 18/696,591

(22) PCT Filed: Sep. 26, 2022

(86) PCT No.: PCT/TR2022/051038
§ 371 (c)(1),
(2) Date: Mar. 28, 2024

(87) PCT Pub. No.: WO2023/055324
PCT Pub. Date: Apr. 6, 2023

(65) Prior Publication Data
US 2024/0409234 A1    Dec. 12, 2024

(30) Foreign Application Priority Data

Sep. 30, 2021  (TR) .............................. 2021/015305

(51) Int. Cl.
*B64D 43/00* (2006.01)
*F41G 3/22* (2006.01)
(Continued)

(52) U.S. Cl.
CPC ............. *B64D 43/00* (2013.01); *F41G 3/225* (2013.01); *B64C 27/04* (2013.01); *B64D 11/0689* (2013.01)

(58) Field of Classification Search
CPC .... B64D 11/0689; B64D 43/00; B64D 45/00; B64C 27/04; F41G 3/225
See application file for complete search history.

(56) References Cited

U.S. PATENT DOCUMENTS 6,377,401 B1   4/2002 Bartlett
8,276,845 B2 * 10/2012 Orgerie .............. B64D 11/0015
                                                    244/122 A
(Continued)

FOREIGN PATENT DOCUMENTS

CN      202938756 U    5/2013
EP        3441720 A1    2/2019

OTHER PUBLICATIONS

International Search Report for PCT application No. PCT/TR2022/051038, mailed Feb. 1, 2023.
(Continued)

*Primary Examiner* — Kevin K Pyo
(74) *Attorney, Agent, or Firm* — Notaro, Michalos & Zaccaria P.C.

(57) ABSTRACT

An alignment system includes a body provided at the air vehicle. An indicator is located on the body and in the pilot's field of vision where at least one guide is located on the body between the indicator and the pilot at a distance from the indicator and the pilot. A reference position enables the pilot to move in the cockpit to the position where the guide and the indicator coincide with respect to the pilot's point of vision enabling the pilot to reach a predetermined position.

15 Claims, 2 Drawing Sheets

(51) Int. Cl.
   *B64C 27/04*   (2006.01)
   *B64D 11/06*   (2006.01)

(56) References Cited

U.S. PATENT DOCUMENTS

2010/0283412 A1    11/2010  Baudou
2014/0209740 A1*   7/2014   Guering ................ B64D 45/00
                                                361/679.01

OTHER PUBLICATIONS

Written Opinion of International Searching Authority and Response for PCT application No. PCT/TR2022/051038, mailed Aug. 25, 2023.
International Preliminary Examination Report for PCT application No. PCT/TR2022/051038, completed Oct. 17, 2023.

* cited by examiner

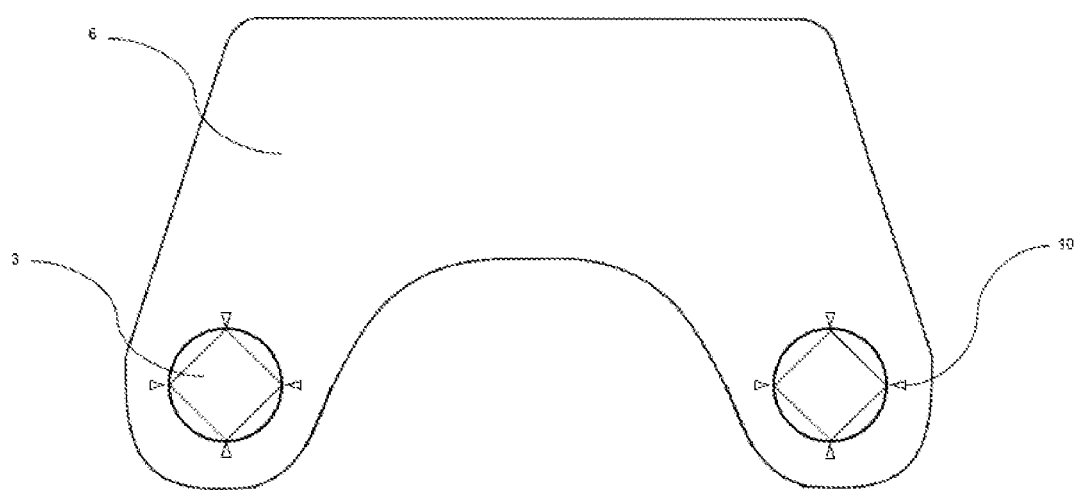
Figure — 3

ALIGNMENT SYSTEM

The present invention relates to an alignment system that allows pilots to adjust their position in the cockpit appropriately.

In modern air vehicles, positions of the displays, panels and controls in the cockpit are positioned according to the eye reference point. Being determined during a design phase, this is the point where a common pilot can theoretically obtain a vision, and is defined as the midpoint of both eyes of the pilot. However, since the pilots using a helicopter will not always be the same size, the inability to bring position-sensitive equipment such as hunter helmets to this point causes the equipment to not work effectively. Moreover, the pilot's failure to adjust his position with respect to the eye reference point may cause the pilot to have difficulty in accessing the control panels in the cockpit, causing blind spots and false readings on some of the displays that the pilot cannot see, as well as increasing the risk of collision with the building, ground support vehicles or other air vehicles on the runway. In order to avoid these problems, the pilots adjust the seat positions according to the eye reference points in the cockpits, making sure that their eye level and therefore their position in the cockpit are appropriate.

In air vehicles covered by the known-state of the art, two balls are provided in the cockpit, which allow the pilot to adjust his/her position and are spaced apart from each other. The pilot determines the reference point by changing the seat position so that the balls are aligned with each other. For two-pilot air vehicles, three triangular balls placed in the cockpit are used. Each pilot adjusts the seat position so that the respective balls are aligned.

U.S. Pat. No. 6,377,401, which is included in the known-state of the art, discloses a camera on a helmet used by the pilots, and markings located in front of the camera to be detected by the camera. When the markings are in a range that can be detected by the camera, head movements of the pilot can be detected and followed by the system so as to direct the equipment.

Another state of the art document no. CN202938756U discloses eye position detection device of head-mounted display with inner and outer helmets. Said device comprises a simulation bracket, wherein simulation interfaces used for corresponding to three installation interfaces of an outer helmet are respectively arranged at left, right and rear sides of the simulation bracket, plugging connectors used for being in insertion fit with three installation interfaces of an inner helmet correspondingly so as to detachably fix the simulation bracket on the inner helmet are arranged in the simulation interfaces respectively, the front side of the simulation bracket is provided with a reference tube mounting frame used for corresponding to designed eye positions of an optical system of the outer helmet, and a reference tube used for identifying the distance between human eyes and the reference tube mounting frame on an observation line when a wearer wears the inner helmet is assembled on the reference tube mounting frame in a back-and-forth guide sliding mode.

Another state of the art document no. EP3441720A1 discloses system and method for hybrid optical/inertial head tracking via numerically stable Kalman Filter. Said system receives head-referenced pose data from a head-mounted IMU and platform-referenced or georeferenced position and orientation data from a platform-mounted IMU, determines error models corresponding to uncertainties associated with both IMUs, and performs an initial estimate of head pose relative to the platform reference frame based on the head-referenced and platform-referenced pose data. A numerically stable UD factorization of the Kalman filter propagates the estimated head pose data forward in time and corrects the initial head pose estimate based on secondary head pose estimates, and corresponding error models, received from an optical or magnetic aiding device.

Another state of the art document no. US2010283412A1 discloses a lip light automatically controlled by the position of the head. According to this document, a head tracking system comprising a computer for measuring and collecting data concerning the attitude of the helmet in motion and its position in space is used. According to said position data, lamp of the lip light is activated.

Thanks to an alignment system according to the present invention, the pilots can adjust their position in the cockpit correctly.

Another object of the present invention is to detect head movements of the pilots precisely and accurately, so that the helmets used by the pilots operate simultaneously and error-free with the systems such as weapon and camera systems on the air vehicle.

Another object of the present invention is to increase flight safety by enabling pilots to adjust their positions in the cockpit according to flight.

The alignment system realized to achieve the object of the present invention, which is defined in the first claim and other claims dependent thereon, comprises a body provided at the air vehicle; at least one indicator located on the body and in the pilot's angle of vision; at least one guide located on the body between the indicator and the pilot; at least one reference position which allows the pilot to access flight controls and control panels of the system inside the body and makes the displays in the cockpit almost completely visible to the pilot, by changing the seat position such that the guide and the indicator are aligned on top of each other with respect to the pilot's angle of vision.

The alignment system of the invention comprises a bracket which extends outward from the body; the guide located on the bracket as an opening; and the reference position in which the guide and the indicator are aligned completely on top of each other with respect to the pilot's angle of vision, thus enabling the pilot to reach a predetermined position in the cockpit.

In an embodiment of the invention, the alignment system comprises at least one helmet which enables the pilot to control the systems on the air vehicle, or reflects the images transmitted from the cameras provided on the air vehicle; at least one sensor system which detects the head movements of the pilot during flight so as to provide data to the camera and weapon systems on the air vehicle, wherein the sensor system is operated while the pilot's eye is in the reference position, thus enabling the pilot's head movements to be detected more accurately and smoothly.

In an embodiment of the invention, the alignment system comprises a first indicator and a second indicator which are located on the body; a first guide located on the bracket when the pilot is in the reference position, and overlapping the first indicator when the pilot closes his/her right eye and looks with his/her left eye; a second guide located on the bracket and coinciding with the second indicator when the pilot closes his/her left eye and looks with his/her right eye.

In an embodiment of the invention, the alignment system comprises the first indicator and the second indicator which, in air vehicles steered by two pilots, allow both pilots to adjust their position in the cockpit using only a single bracket, wherein the first indicator and the second are used by the first pilot when the pilots are in the reference position;

a third indicator which is aligned in an overlapping manner with the first guide used by the second pilot; and a fourth indicator aligned with the second guide in an overlapping manner.

In an embodiment of the invention, the alignment system comprises the bracket which is produced integrally with the body.

In an embodiment of the invention, the alignment system comprises the bracket located on the body in a removable way.

In an embodiment of the invention, the alignment system comprises at least one canopy which protects the panels in the cockpit from sunlight and reflections; the bracket located on the canopy and extending outward from the canopy; and the indicator which is located on the panel.

In an embodiment of the invention, the alignment system comprises the guide located substantially as a circular opening on the bracket.

In an embodiment of the invention, the alignment system comprises the indicator which is substantially surrounded by the guide when the indicator and the guide are aligned in an overlapping manner.

In an embodiment of the invention, the alignment system comprises the indicator which can have polygonal forms such as triangle, quadrilateral, pentagon.

In an embodiment of the invention, the alignment system comprises the indicator whose wall and center are of different colors, thus allowing the pilot to determine the reference position more accurately.

In an embodiment of the invention, the alignment system comprises at least one marking located on the bracket, which indicates the areas that the indicator in a polygonal form, such as a triangle or rectangle, should overlap with the guide when the pilot is at the reference position, thus allowing the pilot to find the reference position more easily and accurately according to the vertices of the polygon.

In an embodiment of the invention, the alignment system comprises the guide, the indicator and the reference position, which are used on attack helicopters or civilian helicopters.

In an embodiment of the invention, the alignment system comprises the sensor system which detects the head movements of the pilot so as to send commands to the camera and weapon systems, thus allowing the camera and weapon systems to be dependent on head movements of the pilot.

The alignment system realized to achieve the object of the present invention is illustrated in the attached drawings, in which:

FIG. 3 is a front view of the bracket.

Figure 1:
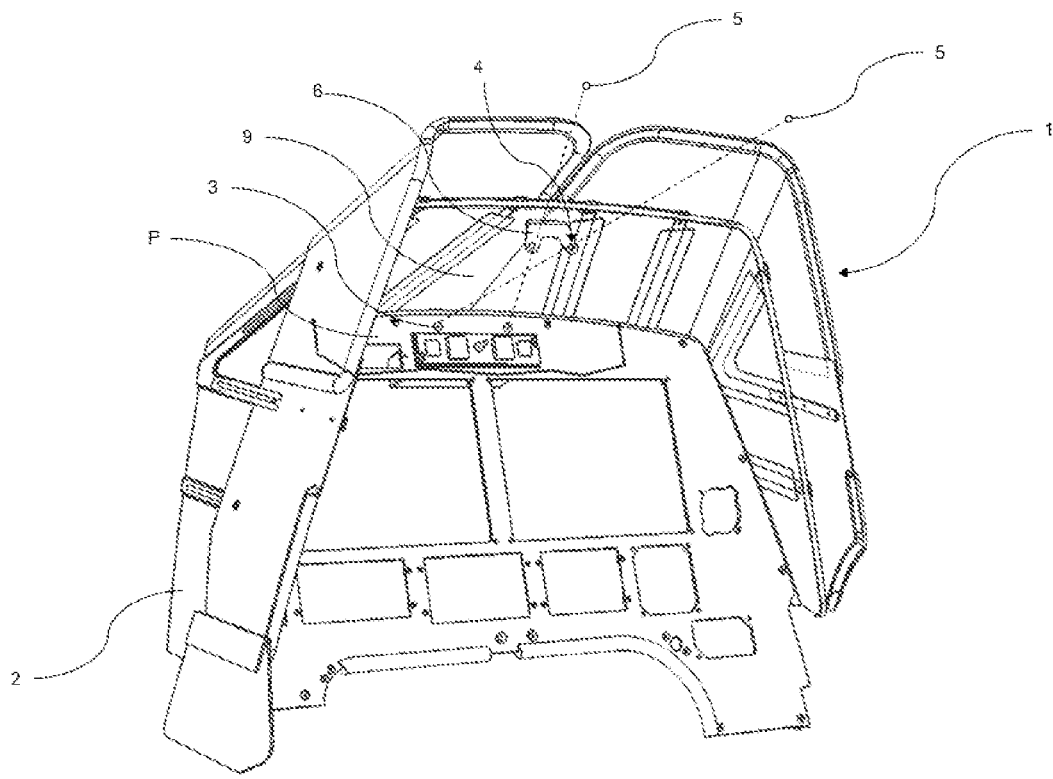
FIG. 1 is a perspective view of the air vehicle cockpit.

All the parts illustrated in figures are individually assigned a reference numeral and the corresponding terms of these numbers are listed below:

1. Alignment System
2. Body
3. Indicator
301. First Indicator
302. Second Indicator
303. Third Indicator
304. Fourth Indicator
4. Guide
401. First Guide
402. Second Guide
5. Reference Position
6. Bracket
7. Helmet
8. Sensor System
9. Canopy
10. Marking
(P) Panel An alignment system (1) comprises a body (2) provided at the air vehicle; at least one indicator (3) located on the body (2) and in the pilot's field of vision; at least one guide (4) located on the body (2) between the indicator (3) and the pilot, at a distance from the indicator (3) and the pilot; at least one reference position (5) which enables the pilot to move in the cockpit to the position where the guide (4) and the indicator (3) almost coincide with respect to the pilot's point of vision, thus enabling the pilot to reach a predetermined position.

An alignment system (1) according to the invention comprises a bracket (6) which is located on the body (2) so as to extend outward from the body (2); the guide (4) located on the bracket (6) as an opening; and the indicator (3) which substantially coincides with the guide (4) when an eye of the pilot is at the reference position (5) (FIG. 1).

The indicator (3) and the guide (4) are located on the body (2) so as to have a certain distance therebetween. From the pilot's point of vision, the position where the indicator (3) and the guide (4) overlap is the reference position (5). The pilot determines the reference position (5) where the indicator (3) and the guide (4) coincides, and adjusts its position in the cockpit according to the reference position (5).

Thanks to the bracket (6) extending outward from the body (2) and the guide (4) located on the bracket (6) as an opening, the pilot can determine the position where the indicator (3) and the guide (4) coincide, in a more precise and accurate manner. By determining the reference position (5), it is possible for the pilot to access the flight controls and system control panels in the cockpit, and the displays in the cockpit to be almost completely visible to the pilot.

Figure 2:
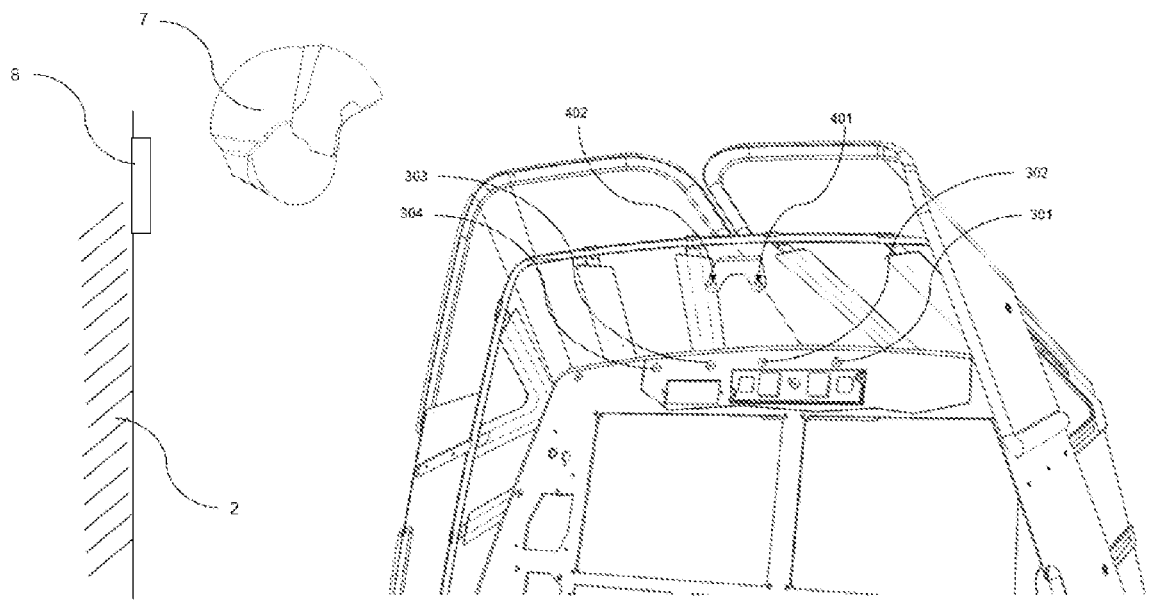
FIG. 2 is a perspective view of the bracket, indicator and guide.

In an embodiment of the invention, an alignment system (1) comprises at least one helmet (7) used by the pilot; at least one sensor system (8) which detects position and movements of the helmet (7) in the cockpit according to the head movements of the pilot, thereby sending commands to the systems in the air vehicle and providing input to the systems; the reference position (5) which enables position and movements of the helmet (7) to be detected by actuating the sensor system (8) while the pilot's eye is in the position where the guide (4) almost visually coincides with the indicator (3). When the guide (4) and the indicator (3) almost coincide with respect to the pilot's point of vision, the helmet (7) used by the pilot comes to a predetermined point in the cockpit. With the reference point (5), the pilots of different heights or sitting in different positions sit in the cockpit in a predetermined position while using the air vehicle, so that the position sensitive helmet (7) and the sensor system (8) operate more effectively (FIG. 2).

In an embodiment of the invention, an alignment system (1) comprises a first indicator (301) and a second indicator (302) which are located on the body (2); a first guide (401) which coincides with the first indicator (301) with respect to the left eye of the pilot, when the pilot is in the reference position (5); a second guide (402) located on the bracket (6) and coinciding with the second indicator (302) with respect to the right eye of the pilot. Therefore, it is guaranteed that both eyes of the pilot are in the reference position (5) with respect to the point of vision. The head angle of the pilot is also adjusted by the reference position (5), which is determined by two points, so that the position of the helmet (7) is brought to a predetermined position more precisely. In this way, the movements of the helmet (7) are perceived more accurately by the sensor system (8).

In an embodiment of the invention, an alignment system (1) comprises a third indicator (303) which allows a second pilot sitting next to the first pilot to adjust his/her position in the cockpit relative to the single bracket (6) on the body (2), wherein the third indicator (303) is located to coincide with the first guide (401) while the second pilot's eye is in the reference position (5); a fourth indicator (304) located to coincide with the second guide (402). Thus, by using only one bracket (6), positions of both pilots in the air vehicle are adjusted according to the reference position (5).

In an embodiment of the invention, an alignment system (1) comprises the bracket (6) which is located integrally on the body (2). The bracket (6) can be produced integrally with the body (2) of the air vehicle.

In an embodiment of the invention, an alignment system (1) comprises the bracket (6) which is removably attached to the body (2). Thus, the bracket (6) and guide (4) can be changed according to the air vehicle used.

In an embodiment of the invention, an alignment system (1) comprises the bracket (6) that is removably attached to the body (2). Thus, the bracket (6) and guide (4) can be changed according to the aircraft used.

In an embodiment of the invention, an alignment system (1) comprises at least one canopy (9) which protects the panels (P) in the cockpit from sunlight; the bracket (6) which extends outward from the canopy (9).

In an embodiment of the invention, an alignment system (1) comprises the guide (4) located on the bracket (6) and having a circular opening.

In an embodiment of the invention, an alignment system (1) comprises the indicator (3) in the form of a circle with a wall almost surrounded by the guide (4) when the pilot is in the reference position (5).

In an embodiment of the invention, an alignment system (1) comprises the indicator (3) which is located on the body (2) in polygonal forms, such as a triangle. Thanks to the corners of the indicator (3), the pilot is enabled to understand more easily that the indicator (3) is overlapped with the guide (4) having a circular opening.

In an embodiment of the invention, an alignment system (1) comprises the indicator (3) whose circumference and center are of different colors, thus allowing the pilot to precisely determine the reference position (5). Thanks to the circumference of the indicator (3), which has a different color compared to its center, the pilot is prevented from sitting at a far distance from the reference position (5).

In an embodiment of the invention, an alignment system (1) comprises at least one marking (10) which is located on the bracket (6) and represents the points where the polygonal indicator (3) and the guide (4) should coincide, thus allowing the pilot to determine the reference position (5) more easily and accurately (FIG. 3).

In an embodiment of the invention, an alignment system (1) comprises the guide (4), the indicator (3) and the reference position (5), which are used on attack helicopters.

In an embodiment of the invention, an alignment system (1) comprises the sensor system (8) which detects movements of the helmet (7) so as to send commands to the camera and weapon systems, thus allowing the camera and weapon systems to operate in conjunction with the head movements of the pilot.

The invention claimed is:

1. An alignment system (1) that allows a first pilot of an air vehicle to adjust their position in a cockpit of the air vehicle comprising a body (2) provided at the air vehicle;
at least one indicator (3) located on the body (2) and in a field of vision of the first pilot;
at least one guide (4) located on the body (2) between the at least one indicator (3) and the first pilot, at a distance from the at least one indicator (3) and the first pilot;
at least one reference position (5) which enables the first pilot to move in the cockpit to a position where the at least one guide (4) and the at least one indicator (3) almost coincide with respect to a point of vision of the first pilot, thus enabling the first pilot to reach a predetermined position;
a bracket (6) is located on the body (2) so as to extend outward from the body (2);
wherein the at least one guide (4) located on the bracket (6) as an opening; and
wherein the at least one indicator (3) substantially coincides with the at least one guide (4) when an eye of the first pilot is at the at least one reference position (5).

2. The alignment system (1) according to claim 1, comprising:
at least one helmet (7) used by the first pilot;
at least one sensor system (8) which detects position and movements of the helmet (7) in the cockpit according to head movements of the first pilot, thereby sending commands to systems in the air vehicle and providing input to the systems; and
wherein the at least one reference position (5) enables position and movements of the helmet (7) to be detected by actuating the at least one sensor system (8) while the eye of the first pilot is in the position where the at least one guide (4) almost visually coincides with the at least one indicator (3).

3. The alignment system (1) according to claim 1, comprising:
a first indicator (301) and a second indicator (302) which are located on the body (2);
a first guide (401) which coincides with the first indicator (301) with respect to a left eye of the first pilot, when the first pilot is in the at least one reference position (5); and
a second guide (402) located on the bracket (6) and coinciding with the second indicator (302) with respect to a right eye of the first pilot.

4. The alignment system (1) according to claim 3, comprising:
a third indicator (303) which allows a second pilot sitting next to the first pilot to adjust his/her position in the cockpit relative to the bracket (6) on the body (2), wherein the third indicator (303) is located to coincide with the first guide (401) while an eye of the second pilot is in the at least one reference position (5); and
a fourth indicator (304) located to coincide with the second guide (402).

5. The alignment system (1) according to claim 1, wherein the bracket (6) is located integrally on the body (2).

6. The alignment system (1) according to claim 1, wherein the bracket (6) is removably attached to the body (2).

7. The alignment system (1) according to claim 1 comprising:
at least one canopy (9) which protects panels (P) in the cockpit from sunlight; and
wherein the bracket (6) extends outward from the canopy (9).

8. The alignment system (1) according to claim 1, wherein the at least one guide (4) is located on the bracket (6) and has a circular opening.

9. The alignment system (1) according to claim 1, wherein the at least one indicator (3) is in a form of a circle with a wall almost surrounded by the at least one guide (4) when the first pilot is in the at least one reference position (5).

10. The alignment system (1) according to claim 1, wherein the at least one indicator (3) is located on the body (2) in polygonal forms.

11. The alignment system (1) according to claim 1, wherein the at least one indicator (3) has a circumference and center are of different colors to the first pilot to precisely determine the at least one reference position (5).

12. The alignment system (1) according to claim 1, comprising at least one marking (10) located on the bracket (6) that represents at least one point where the at least one indicator (3) and the at least one guide (4) coincide to allow the first pilot to determine the at least one reference position (5).

13. The alignment system (1) according to claim 1, wherein the at least one guide (4), the at least one indicator (3), and the at least one reference position (5), are used on attack helicopters.

14. The alignment system (1) according to claim 2, wherein the sensor system (8) detects movements of the helmet (7) so as to send commands to camera and weapon systems to allow the camera and weapon systems to operate in conjunction with the head movements of the first pilot.

15. The alignment system (1) according to claim 1, wherein the at least one indicator (3) is located on the body (2) in a triangular form.

* * * * *